United States Patent
Satat et al.

(10) Patent No.: US 11,769,269 B2
(45) Date of Patent: Sep. 26, 2023

(54) FUSING MULTIPLE DEPTH SENSING MODALITIES

(71) Applicant: Google LLC, Mountain View, CA (US)

(72) Inventors: Guy Satat, Sunnnyvale, CA (US);
Michael Quinlan, Sunnyvale, CA (US);
Sean Kirmani, San Francisco, CA (US); Anelia Angelova, Mountain View, CA (US); Ariel Gordon, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/878,535

(22) Filed: Aug. 1, 2022

(65) Prior Publication Data

US 2022/0366590 A1 Nov. 17, 2022

Related U.S. Application Data

(63) Continuation of application No. 16/726,771, filed on Dec. 24, 2019, now Pat. No. 11,450,018.

(51) Int. Cl.
| | |
|---|---|
| *G06T 7/593* | (2017.01) |
| *B25J 13/08* | (2006.01) |
| *G06T 3/20* | (2006.01) |
| *H04N 13/128* | (2018.01) |
| *G05D 1/02* | (2020.01) |
| *H04N 13/00* | (2018.01) |

(52) U.S. Cl.
CPC ............. *G06T 7/593* (2017.01); *B25J 13/089* (2013.01); *G05D 1/0231* (2013.01); *G06T 3/20* (2013.01); *H04N 13/128* (2018.05); *G06T 2207/10028* (2013.01); *H04N 2013/0081* (2013.01)

(58) Field of Classification Search
USPC .................... 382/154, 254, 282, 294; 348/47
See application file for complete search history.

(56) References Cited

U.S. PATENT DOCUMENTS

| | | | |
|---|---|---|---|
| 8,340,402 B2 | 12/2012 | Schmitt et al. | |
| 8,643,701 B2 | 2/2014 | Nguyen et al. | |
| 8,811,692 B2 | 8/2014 | Prokoski | |
| 9,625,258 B2 | 4/2017 | Deichmann et al. | |
| 10,074,158 B2 * | 9/2018 | Siddiqui | H04N 13/271 |
| 10,359,855 B1 * | 7/2019 | Vonikakis | G06F 3/011 |
| 10,706,505 B2 | 7/2020 | Tong et al. | |
| 10,984,543 B1 | 4/2021 | Srinivasan | |

(Continued)

*Primary Examiner* — Kathleen Y Dulaney
(74) *Attorney, Agent, or Firm* — McDonnell Boehnen Hulbert & Berghoff LLP

(57) ABSTRACT

A method includes receiving a first depth map that includes a plurality of first pixel depths and a second depth map that includes a plurality of second pixel depths. The first depth map corresponds to a reference depth scale and the second depth map corresponds to a relative depth scale. The method includes aligning the second pixel depths with the first pixel depths. The method includes transforming the aligned region of the second pixel depths such that transformed second edge pixel depths of the aligned region are coextensive with first edge pixel depths surrounding the corresponding region of the first pixel depths. The method includes generating a third depth map. The third depth map includes a first region corresponding to the first pixel depths and a second region corresponding to the transformed and aligned region of the second pixel depths.

20 Claims, 10 Drawing Sheets

(56) References Cited

U.S. PATENT DOCUMENTS

| | | |
|---|---|---|
| 11,450,018 B1* | 9/2022 | Satat .................. B25J 13/089 |
| 2001/0036307 A1 | 11/2001 | Hanna et al. |
| 2009/0073419 A1 | 3/2009 | Gesner et al. |
| 2009/0196491 A1 | 8/2009 | Stainlay et al. |
| 2010/0172567 A1 | 7/2010 | Prokoski |
| 2010/0309292 A1 | 12/2010 | Ho et al. |
| 2011/0115886 A1 | 5/2011 | Nguyen et al. |
| 2012/0056982 A1 | 3/2012 | Katz et al. |
| 2012/0113219 A1* | 5/2012 | Chang ................ H04N 13/139 348/43 |
| 2012/0120192 A1* | 5/2012 | Alregib ............... H04N 13/128 348/E13.064 |
| 2012/0163701 A1 | 6/2012 | Gomi |
| 2013/0107005 A1* | 5/2013 | Lim .................... H04N 13/271 348/46 |
| 2013/0129193 A1 | 5/2013 | Wang |
| 2013/0230235 A1 | 9/2013 | Tateno et al. |
| 2014/0118494 A1 | 5/2014 | Wu et al. |
| 2014/0153816 A1 | 6/2014 | Cohen et al. |
| 2015/0036926 A1* | 2/2015 | Choi ........................ G06T 5/00 382/167 |
| 2015/0235373 A1 | 8/2015 | Kato et al. |
| 2016/0134858 A1* | 5/2016 | Xie ..................... H04N 13/257 348/46 |
| 2016/0330434 A1* | 11/2016 | Chen .................. G01B 11/2513 |
| 2017/0180639 A1 | 6/2017 | Kamilov et al. |
| 2017/0289515 A1 | 10/2017 | Li et al. |
| 2017/0302910 A1 | 10/2017 | Richards |
| 2018/0293748 A1* | 10/2018 | Lee ....................... H04N 13/25 |
| 2018/0302606 A1 | 10/2018 | Lee |
| 2018/0336737 A1 | 11/2018 | Varady et al. |
| 2019/0007590 A1* | 1/2019 | Lee .................... H04N 5/23238 |
| 2019/0035099 A1* | 1/2019 | Ebrahimi Afrouzi .. G06N 3/008 |
| 2019/0073792 A1* | 3/2019 | Fletcher ................ G01C 11/00 |
| 2019/0188871 A1* | 6/2019 | Fletcher ............... H04N 13/111 |
| 2020/0090358 A1* | 3/2020 | Sun ........................ G06T 7/97 |
| 2020/0177870 A1 | 6/2020 | Tadi et al. |
| 2021/0065392 A1 | 3/2021 | Bleyer et al. |
| 2021/0304494 A1 | 9/2021 | Yamamoto et al. |

* cited by examiner

FUSING MULTIPLE DEPTH SENSING MODALITIES

CROSS-REFERENCE TO RELATED APPLICATIONS

This application is a continuation of and claims priority to U.S. patent application Ser. No. 16/726,771, filed Dec. 24, 2019, and titled "Fusing multiple depth sensing modalities," which is hereby incorporated by reference as if fully set forth in this description.

BACKGROUND

As technology advances, various types of robotic devices are being created for performing a variety of functions that may assist users. Robotic devices may be used for applications involving material handling, transportation, welding, assembly, and dispensing, among others. Over time, the manner in which these robotic systems operate is becoming more intelligent, efficient, and intuitive. As robotic systems become increasingly prevalent in numerous aspects of modern life, it is desirable for robotic systems to be efficient. Therefore, a demand for efficient robotic systems has helped open up a field of innovation in actuators, movement, sensing techniques, as well as component design and assembly.

SUMMARY

Example embodiments involve a computing device configured for generating a depth map based on a first depth map and a second depth map. The first depth map and the second depth map may correspond to different sensors, and the computing device may generate the depth map based on characteristics of the first depth map and the second depth map derived from each respective sensor. In some examples, the computing device may be a robot control system, and the generated depth map can be used for performing tasks of the robot, such as navigating within an environment represented by the depth map or interacting with objects in the environment based on depth information provided in the depth map.

In an embodiment, a method is provided. The method includes receiving, by a computing device, a first depth map that includes a plurality of first pixel depths and a second depth map that includes a plurality of second pixel depths. The first depth map corresponds to a reference depth scale and the second depth map corresponds to a relative depth scale. The method includes aligning, by the computing device, the second pixel depths with the first pixel depths. The method includes identifying, by the computing device, an aligned region of the second pixel depths having a greater amount of depth information than a corresponding region of the first pixel depths. The method includes transforming, by the computing device, the aligned region of the second pixel depths based on the reference depth scale and the relative depth scale such that transformed second edge pixel depths of the aligned region are coextensive with first edge pixel depths surrounding the corresponding region of the first pixel depths. The method includes generating, by the computing device, a third depth map. The third depth map includes a first region corresponding to the first pixel depths and a second region corresponding to the transformed and aligned region of the second pixel depths. The first region and the second region are joined at the first edge pixel depths and second edge pixel depths.

In another embodiment, a system is provided. The system includes a first sensor, a second sensor, a computing device having one or more processors, a non-transitory computer readable medium, and program instructions stored on the non-transitory computer readable medium and executable by the one or more processors to determine a first depth map that includes a plurality of first pixel depths based on first sensor data from a first sensor. The instructions are executable by the one or more processors to determine a second depth map that includes a plurality of second pixel depths, based on second sensor data from a second sensor. The first depth map corresponds to a reference depth scale and the second depth map corresponds to a relative depth scale. The instructions are executable by the one or more processors to align the second pixel depths with the first pixel depths. The instructions are executable by the one or more processors to identify an aligned region of the second pixel depths having a greater amount of depth information than a corresponding region of the first pixel depths. The instructions are executable by the one or more processors to transform the aligned region of the second pixel depths based on the reference depth scale and the relative depth scale such that transformed second edge pixel depths of the aligned region are coextensive with first edge pixel depths surrounding the corresponding region of the first pixel depths. The instructions are executable by the one or more processors to generate a third depth map. The third depth map includes a first region corresponding to the first pixel depths and a second region corresponding to the transformed and aligned region of the second pixel depths. The first region and the second region are joined at the first edge pixel depths and second edge pixel depths. In a further embodiment, a non-transitory computer readable medium is provided. The non-transitory computer readable medium has stored therein instructions executable by one or more processors to cause a computing system to perform functions. The functions include receiving a first depth map that includes a plurality of first pixel depths and a second depth map that includes a plurality of second pixel depths. The first depth map corresponds to a reference depth scale and the second depth map corresponds to a relative depth scale. The functions include aligning the second pixel depths with the first pixel depths. The functions include identifying an aligned region of the second pixel depths having a greater amount of depth information than a corresponding region of the first pixel depths. The functions include transforming the aligned region of the second pixel depths based on the reference depth scale and the relative depth scale such that transformed second edge pixel depths of the aligned region are coextensive with first edge pixel depths surrounding the corresponding region of the first pixel depths. The functions include generating a third depth map. The third depth map includes a first region corresponding to the first pixel depths and a second region corresponding to the transformed and aligned region of the second pixel depths. The first region and the second region are joined at the first edge pixel depths and second edge pixel depths.

In another embodiment, a system is provided. The system includes means for receiving a first depth map that includes a plurality of first pixel depths and a second depth map that includes a plurality of second pixel depths. The first depth map corresponds to a reference depth scale and the second depth map corresponds to a relative depth scale. The system includes means for aligning the second pixel depths with the first pixel depths. The system includes means for identifying an aligned region of the second pixel depths having a greater amount of depth information than a corresponding region of the first pixel depths. The system includes means for transforming the aligned region of the second pixel depths based on the reference depth scale and the relative depth scale such that transformed second edge pixel depths of the aligned region are coextensive with first edge pixel depths surrounding the corresponding region of the first pixel depths. The system includes means for generating a third depth map. The third depth map includes a first region corresponding to the first pixel depths and a second region corresponding to the transformed and aligned region of the second pixel depths. The first region and the second region are joined at the first edge pixel depths and second edge pixel depths.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

DETAILED DESCRIPTION

Figure 1:
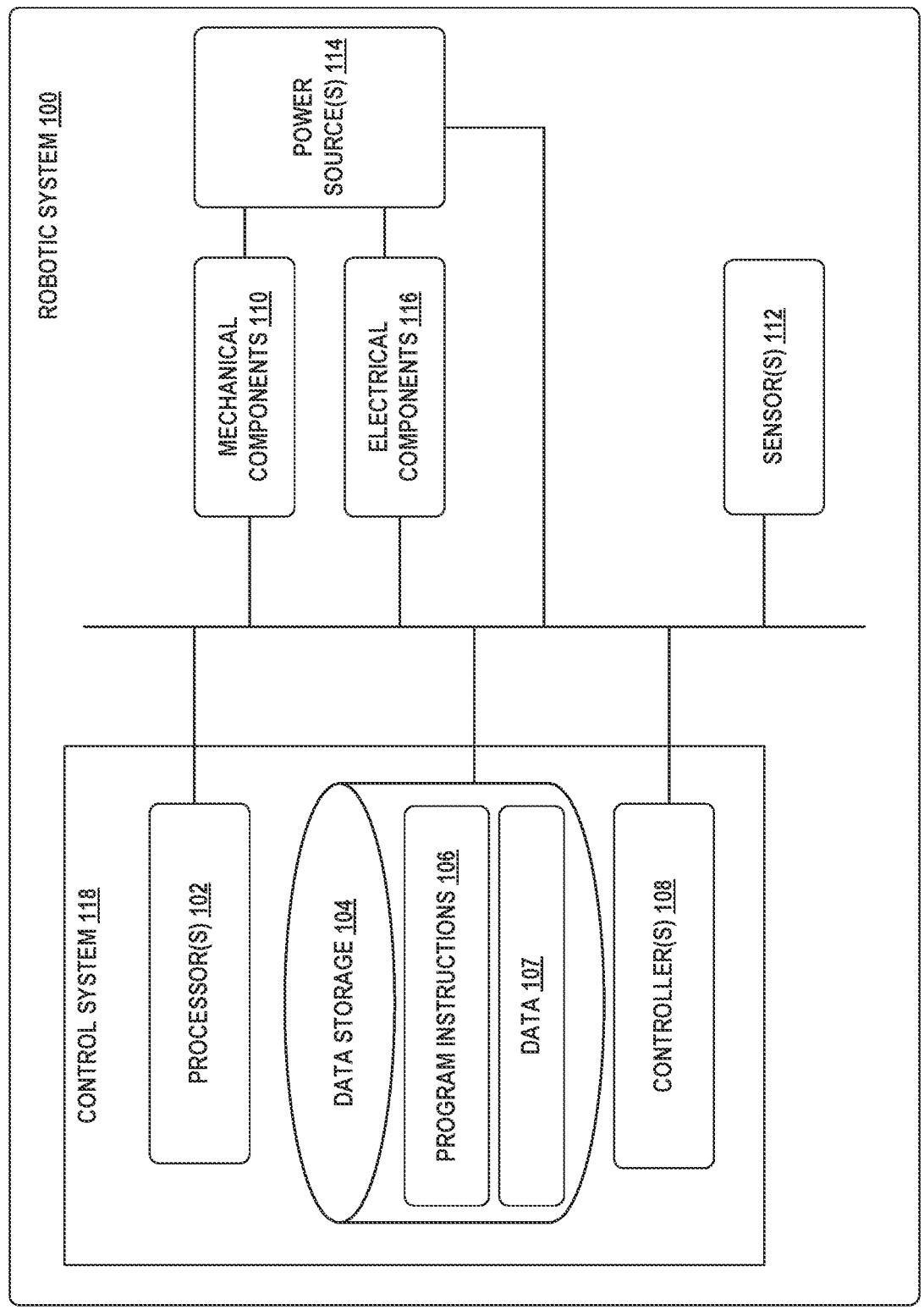
FIG. 1 illustrates a method, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless indicated as such. Other embodiments can be utilized, and other changes can be made, without departing from the scope of the subject matter presented herein.

Thus, the example embodiments described herein are not meant to be limiting. It will be readily understood that the aspects of the present disclosure, as generally described herein, and illustrated in the figures, can be arranged, substituted, combined, separated, and designed in a wide variety of different configurations.

Throughout this description, the articles "a" or "an" are used to introduce elements of the example embodiments. Any reference to "a" or "an" refers to "at least one," and any reference to "the" refers to "the at least one," unless otherwise specified, or unless the context clearly dictates otherwise. The intent of using the conjunction "or" within a described list of at least two terms is to indicate any of the listed terms or any combination of the listed terms.

The use of ordinal numbers such as "first," "second," "third" and so on is to distinguish respective elements rather than to denote a particular order of those elements. For purpose of this description, the terms "multiple" and "a plurality of" refer to "two or more" or "more than one."

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment. In the figures, similar symbols typically identify similar components, unless context dictates otherwise. Further, unless otherwise noted, figures are not drawn to scale and are used for illustrative purposes only. Moreover, the figures are representational only and not all components are shown. For example, additional structural or restraining components might not be shown.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Overview

A depth map typically includes a two-dimensional (2D) representation of a three-dimensional (3D) space. In particular, a 2D array of pixel depths can show 3D features in an environment that are captured from a sensor. Depth maps are typically derived from a particular sensor or configurations of sensors. Generating depth data from different sensors may result in different resolutions between pixel depths and accuracy levels of pixel depths. For example, a Light Ranging and Detection (LIDAR) device may obtain data by emitting light pulses within an environment and detecting reflected light pulses. Detecting a time of flight of each respective reflected pulse provides an accurate distance estimate, but there may be less spatial data available than that provided by depth maps derived from images, such as multiscopic images. Different sensors may also have difficulty representing depth information for certain parts of an environment. For example, a stereoscopic image capture device may result in a depth map that does not reliably produce depth information for transparent, partially-transparent, refractive, specular, or textureless materials, such as windows, and can also be inhibited by occlusions, but may otherwise provide a relatively accurate representation of other objects and/or targets within the environment. By contrast, monoscopic images may produce more complete depth information that represents such transparent, partially-transparent, refractive, specular materials, or textureless materials, and not be inhibited by occlusions, but may be less accurate than depth maps derived from stereoscopic image data or LIDAR data. Having inaccurate or incomplete depth information about an environment can impact a system. For example, in the context of a robot using one or more sensors to determine a depth map of an environment, the robot may have difficulty navigating within the environment or interacting with objects in the environment when the depth map includes incomplete or inaccurate depth information. This may be particularly relevant when the robot first determines whether to perform an operation based on a confidence score for accomplishing the operation successfully.

Example embodiments involve a system (e.g., a robot) that fuses a plurality of depth maps derived from different sensors in order to generate a depth map that more completely and accurately represents a scene. Generating this depth map may involve leveraging particular characteristics of respective sensors and/or depth maps to generate a complete and cohesive depth map. For example, regions of a stereoscopic depth map have relatively little depth information, or low-confidence depth information, in particular regions. These regions can correspond to transparent, partially-transparent, refractive, or specular materials in an environment, or result from occlusions and regions with a relatively high signal-to-noise ratio (SNR), and can be represented with NULL points in the depth map array. Generating a depth map based on the stereoscopic depth map may involve "inpainting" within these regions in order to provide more complete depth information.

Inpainting regions of a first depth map (e.g., a stereoscopic depth map) involves aligning and transforming one or more regions of a second depth map that is fused with the first depth map. In particular, the regions in the second depth map may be scaled according to a reference scale of the first depth map and merged with an edge of the inpainted region of the first depth map such that the fused regions are coextensive. Within examples, an optimization function can be implemented to fuse these regions. Inpainting in this manner may allow for more complete information in a resulting depth map.

In order to produce usable depth information, it may be beneficial for a depth map to have scale that relates to actual distances in an environment. For example, 3D point clouds from a LIDAR device can be understood in terms of absolute distances (e.g., represented by meters or feet) between objects in an environment and the LIDAR device. Multiscopic depth maps may have similar depth scale information derived from disparities between respective pixels in captured images and known baseline distances between each image capture device. However, other types of sensors may produce depth maps with relative scale (e.g., depth is determined relative to other pixels in the array, and can be represented from 0 to 1, without distance units) that is less useful for practical applications, such as navigation. This may be the case with monoscopic depth maps. For example, a monoscopic depth map may provide more complete depth information in a local scale (i.e., relative to neighboring pixel depths), but does not necessarily include scale in terms of distance units. Accordingly, scaling this depth information to a global scale can be beneficial for completing areas of a depth map that are lacking depth information. Accordingly, a first depth map may be selected for purposes of providing a reference scale for merging purposes based on the sensor used for generating the first depth map. The second depth map may be selected for purposes of providing more complete depth information. A third sensor and corresponding depth map can be fused with the first and second depth maps as well. Thus a depth map can be generated including depth information received from a plurality of sensors.

By using two or more different depth maps to generate a third depth map, a system can negate shortcomings of different sensors (e.g., incomplete information in stereoscopic depth maps and unscaled information in monoscopic depth maps). This may allow operations that rely on depth information to be performed with more confidence. In the context of a robotic system, this may be particularly relevant when navigating through an environment or interacting with objects in the environment.

II. Example Robotic Systems

FIG. 1 illustrates an example configuration of a robotic system that may be used in connection with the implementations described herein. Robotic system 100 may be configured to operate autonomously, semi-autonomously, or using directions provided by user(s). Robotic system 100 may be implemented in various forms, such as a robotic arm, industrial robot, or some other arrangement. Some example implementations involve a robotic system 100 engineered to be low cost at scale and designed to support a variety of tasks. Robotic system 100 may be designed to be capable of operating around people. Robotic system 100 may also be optimized for machine learning. Throughout this description, robotic system 100 may also be referred to as a robot, robotic device, or mobile robot, among other designations.

As shown in FIG. 1, robotic system 100 may include processor(s) 102, data storage 104, and controller(s) 108, which together may be part of control system 118. Robotic system 100 may also include sensor(s) 112, power source(s) 114, mechanical components 110, and electrical components 116. Nonetheless, robotic system 100 is shown for illustrative purposes, and may include more or fewer components. The various components of robotic system 100 may be connected in any manner, including wired or wireless connections. Further, in some examples, components of robotic system 100 may be distributed among multiple physical entities rather than a single physical entity. Other example illustrations of robotic system 100 may exist as well.

Processor(s) 102 may operate as one or more general-purpose hardware processors or special purpose hardware processors (e.g., digital signal processors, application specific integrated circuits, etc.). Processor(s) 102 may be configured to execute computer-readable program instructions 106, and manipulate data 107, both of which are stored in data storage 104. Processor(s) 102 may also directly or indirectly interact with other components of robotic system 100, such as sensor(s) 112, power source(s) 114, mechanical components 110, or electrical components 116.

Data storage 104 may be one or more types of hardware memory. For example, data storage 104 may include or take the form of one or more computer-readable storage media that can be read or accessed by processor(s) 102. The one or more computer-readable storage media can include volatile or non-volatile storage components, such as optical, magnetic, organic, or another type of memory or storage, which can be integrated in whole or in part with processor(s) 102. In some implementations, data storage 104 can be a single physical device. In other implementations, data storage 104 can be implemented using two or more physical devices, which may communicate with one another via wired or wireless communication. As noted previously, data storage 104 may include the computer-readable program instructions 106 and data 107. Data 107 may be any type of data, such as configuration data, sensor data, or diagnostic data, among other possibilities.

Controller 108 may include one or more electrical circuits, units of digital logic, computer chips, or microprocessors that are configured to (perhaps among other tasks), interface between any combination of mechanical components 110, sensor(s) 112, power source(s) 114, electrical components 116, control system 118, or a user of robotic system 100. In some implementations, controller 108 may be a purpose-built embedded device for performing specific operations with one or more subsystems of the robotic system 100.

Control system 118 may monitor and physically change the operating conditions of robotic system 100. In doing so, control system 118 may serve as a link between portions of robotic system 100, such as between mechanical components 110 or electrical components 116. In some instances, control system 118 may serve as an interface between robotic system 100 and another computing device. Further, control system 118 may serve as an interface between robotic system 100 and a user. In some instances, control system 118 may include various components for communicating with robotic system 100, including a joystick, buttons, or ports, etc. The example interfaces and communications noted above may be implemented via a wired or wireless connection, or both. Control system 118 may perform other operations for robotic system 100 as well.

During operation, control system 118 may communicate with other systems of robotic system 100 via wired or wireless connections, and may further be configured to communicate with one or more users of the robot. As one possible illustration, control system 118 may receive an input (e.g., from a user or from another robot) indicating an instruction to perform a requested task, such as to pick up and move an object from one location to another location. Based on this input, control system 118 may perform operations to cause the robotic system 100 to make a sequence of movements to perform the requested task. As another illustration, a control system may receive an input indicating an instruction to move to a requested location. In response, control system 118 (perhaps with the assistance of other components or systems) may determine a direction and speed to move robotic system 100 through an environment en route to the requested location.

Operations of control system 118 may be carried out by processor(s) 102. Alternatively, these operations may be carried out by controller(s) 108, or a combination of processor(s) 102 and controller(s) 108. In some implementations, control system 118 may partially or wholly reside on a device other than robotic system 100, and therefore may at least in part control robotic system 100 remotely.

Mechanical components 110 represent hardware of robotic system 100 that may enable robotic system 100 to perform physical operations. As a few examples, robotic system 100 may include one or more physical members, such as an arm, an end effector, a head, a neck, a torso, a base, and wheels. The physical members or other parts of robotic system 100 may further include actuators arranged to move the physical members in relation to one another. Robotic system 100 may also include one or more structured bodies for housing control system 118 or other components, and may further include other types of mechanical components. The particular mechanical components 110 used in a given robot may vary based on the design of the robot, and may also be based on the operations or tasks the robot may be configured to perform.

In some examples, mechanical components 110 may include one or more removable components. Robotic system 100 may be configured to add or remove such removable components, which may involve assistance from a user or another robot. For example, robotic system 100 may be configured with removable end effectors or digits that can be replaced or changed as needed or desired. In some implementations, robotic system 100 may include one or more removable or replaceable battery units, control systems, power systems, bumpers, or sensors. Other types of removable components may be included within some implementations.

Robotic system 100 may include sensor(s) 112 arranged to sense aspects of robotic system 100. Sensor(s) 112 may include one or more force sensors, torque sensors, velocity sensors, acceleration sensors, position sensors, proximity sensors, motion sensors, location sensors, load sensors, temperature sensors, touch sensors, depth sensors, ultrasonic range sensors, infrared sensors, object sensors, or cameras, among other possibilities. Within some examples, robotic system 100 may be configured to receive sensor data from sensors that are physically separated from the robot (e.g., sensors that are positioned on other robots or located within the environment in which the robot is operating).

Sensor(s) 112 may provide sensor data to processor(s) 102 (perhaps by way of data 107) to allow for interaction of robotic system 100 with its environment, as well as monitoring of the operation of robotic system 100. The sensor data may be used in evaluation of various factors for activation, movement, and deactivation of mechanical components 110 and electrical components 116 by control system 118. For example, sensor(s) 112 may capture data corresponding to the terrain of the environment or location of nearby objects, which may assist with environment recognition and navigation.

In some examples, sensor(s) 112 may include RADAR (e.g., for long-range object detection, distance determination, or speed determination), LIDAR (e.g., for short-range object detection, distance determination, or speed determination), SONAR (e.g., for underwater object detection, distance determination, or speed determination), VICON® (e.g., for motion capture), one or more cameras (e.g., stereoscopic cameras for 3D vision), a global positioning system (GPS) transceiver, or other sensors for capturing information of the environment in which robotic system 100 is operating. Sensor(s) 112 may monitor the environment in real time, and detect obstacles, elements of the terrain, weather conditions, temperature, or other aspects of the environment. In another example, sensor(s) 112 may capture data corresponding to one or more characteristics of a target or identified object, such as a size, shape, profile, structure, or orientation of the object.

Further, robotic system 100 may include sensor(s) 112 configured to receive information indicative of the state of robotic system 100, including sensor(s) 112 that may monitor the state of the various components of robotic system 100. Sensor(s) 112 may measure activity of systems of robotic system 100 and receive information based on the operation of the various features of robotic system 100, such as the operation of an extendable arm, an end effector, or other mechanical or electrical features of robotic system 100. The data provided by sensor(s) 112 may enable control system 118 to determine errors in operation as well as monitor overall operation of components of robotic system 100.

As an example, robotic system 100 may use force/torque sensors to measure load on various components of robotic system 100. In some implementations, robotic system 100 may include one or more force/torque sensors on an arm or end effector to measure the load on the actuators that move one or more members of the arm or end effector. In some examples, the robotic system 100 may include a force/torque sensor at or near the wrist or end effector, but not at or near other joints of a robotic arm. In further examples, robotic system 100 may use one or more position sensors to sense the position of the actuators of the robotic system. For instance, such position sensors may sense states of extension, retraction, positioning, or rotation of the actuators on an arm or end effector.

As another example, sensor(s) 112 may include one or more velocity or acceleration sensors. For instance, sensor(s) 112 may include an inertial measurement unit (IMU). The IMU may sense velocity and acceleration in the world frame, with respect to the gravity vector. The velocity and acceleration sensed by the IMU may then be translated to that of robotic system 100 based on the location of the IMU in robotic system 100 and the kinematics of robotic system 100.

Robotic system 100 may include other types of sensors not explicitly discussed herein. Additionally or alternatively, the robotic system may use particular sensors for purposes not enumerated herein.

Robotic system 100 may also include one or more power source(s) 114 configured to supply power to various components of robotic system 100. Among other possible power systems, robotic system 100 may include a hydraulic system, electrical system, batteries, or other types of power systems. As an example illustration, robotic system 100 may include one or more batteries configured to provide charge to components of robotic system 100. Some of mechanical components 110 or electrical components 116 may each connect to a different power source, may be powered by the same power source, or be powered by multiple power sources.

Any type of power source may be used to power robotic system 100, such as electrical power or a gasoline engine. Additionally or alternatively, robotic system 100 may include a hydraulic system configured to provide power to mechanical components 110 using fluid power. Components of robotic system 100 may operate based on hydraulic fluid being transmitted throughout the hydraulic system to various hydraulic motors and hydraulic cylinders, for example. The hydraulic system may transfer hydraulic power by way of pressurized hydraulic fluid through tubes, flexible hoses, or other links between components of robotic system 100. Power source(s) 114 may charge using various types of charging, such as wired connections to an outside power source, wireless charging, combustion, or other examples.

Electrical components 116 may include various mechanisms capable of processing, transferring, or providing electrical charge or electric signals. Among possible examples, electrical components 116 may include electrical wires, circuitry, or wireless communication transmitters and receivers to enable operations of robotic system 100. Electrical components 116 may interwork with mechanical components 110 to enable robotic system 100 to perform various operations. Electrical components 116 may be configured to provide power from power source(s) 114 to the various mechanical components 110, for example. Further, robotic system 100 may include electric motors. Other examples of electrical components 116 may exist as well.

Robotic system 100 may include a body, which may connect to or house appendages and components of the robotic system. As such, the structure of the body may vary within examples and may further depend on particular operations that a given robot may have been designed to perform. For example, a robot developed to carry heavy loads may have a wide body that enables placement of the load. Similarly, a robot designed to operate in tight spaces may have a relatively tall, narrow body. Further, the body or the other components may be developed using various types of materials, such as metals or plastics. Within other examples, a robot may have a body with a different structure or made of various types of materials.

The body or the other components may include or carry sensor(s) 112. These sensors may be positioned in various locations on the robotic system 100, such as on a body, a head, a neck, a base, a torso, an arm, or an end effector, among other examples.

Robotic system 100 may be configured to carry a load, such as a type of cargo that is to be transported. In some examples, the load may be placed by the robotic system 100 into a bin or other container attached to the robotic system 100. The load may also represent external batteries or other types of power sources (e.g., solar panels) that the robotic system 100 may utilize. Carrying the load represents one example use for which the robotic system 100 may be configured, but the robotic system 100 may be configured to perform other operations as well.

As noted above, robotic system 100 may include various types of appendages, wheels, end effectors, gripping devices and so on. In some examples, robotic system 100 may include a mobile base with wheels, treads, or some other form of locomotion. Additionally, robotic system 100 may include a robotic arm or some other form of robotic manipulator. In the case of a mobile base, the base may be considered as one of mechanical components 110 and may include wheels, powered by one or more of actuators, which allow for mobility of a robotic arm in addition to the rest of the body.

Figure 2:
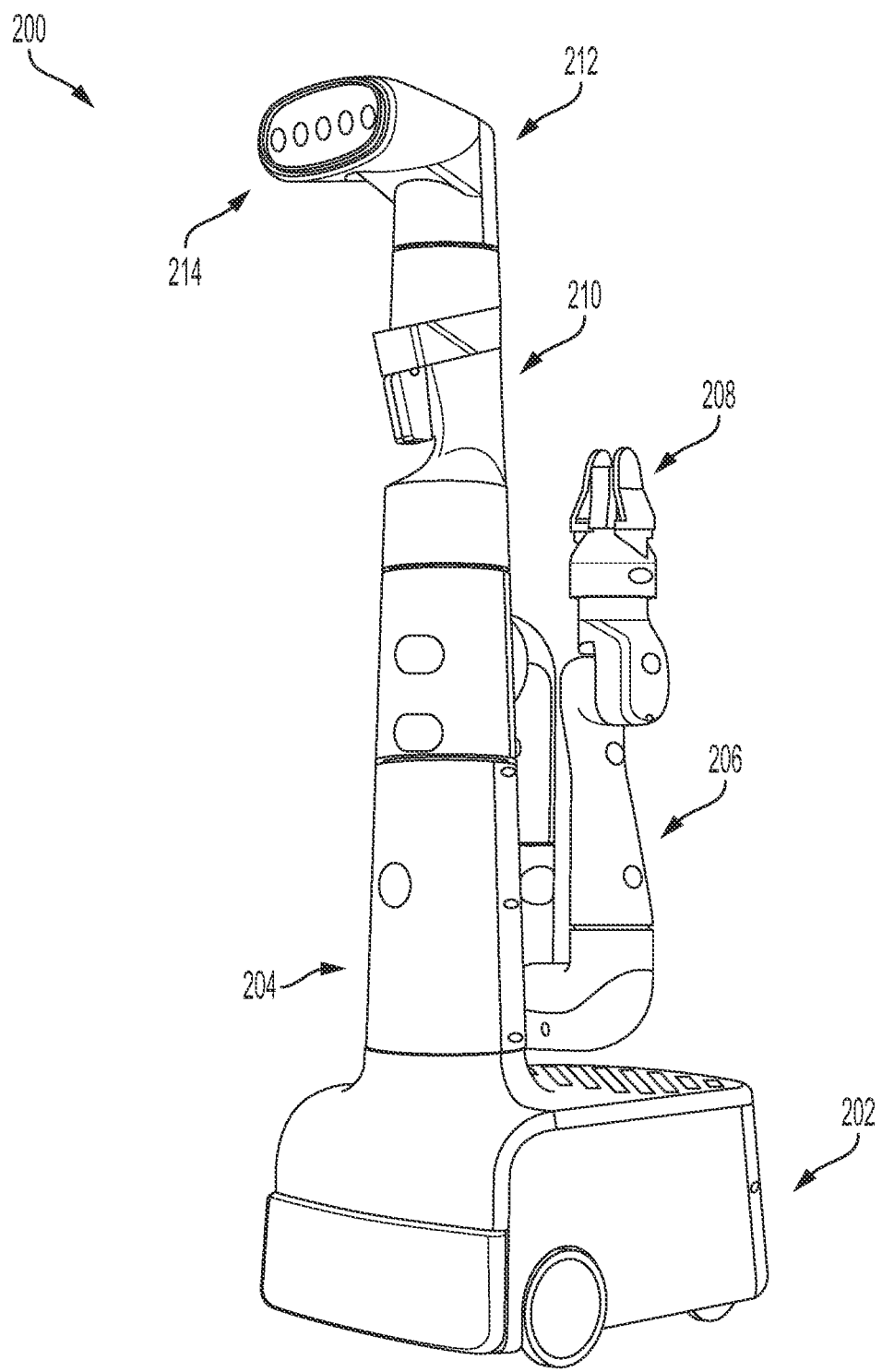
FIG. 2 illustrates a mobile robot, in accordance with example embodiments.
Figure 3:
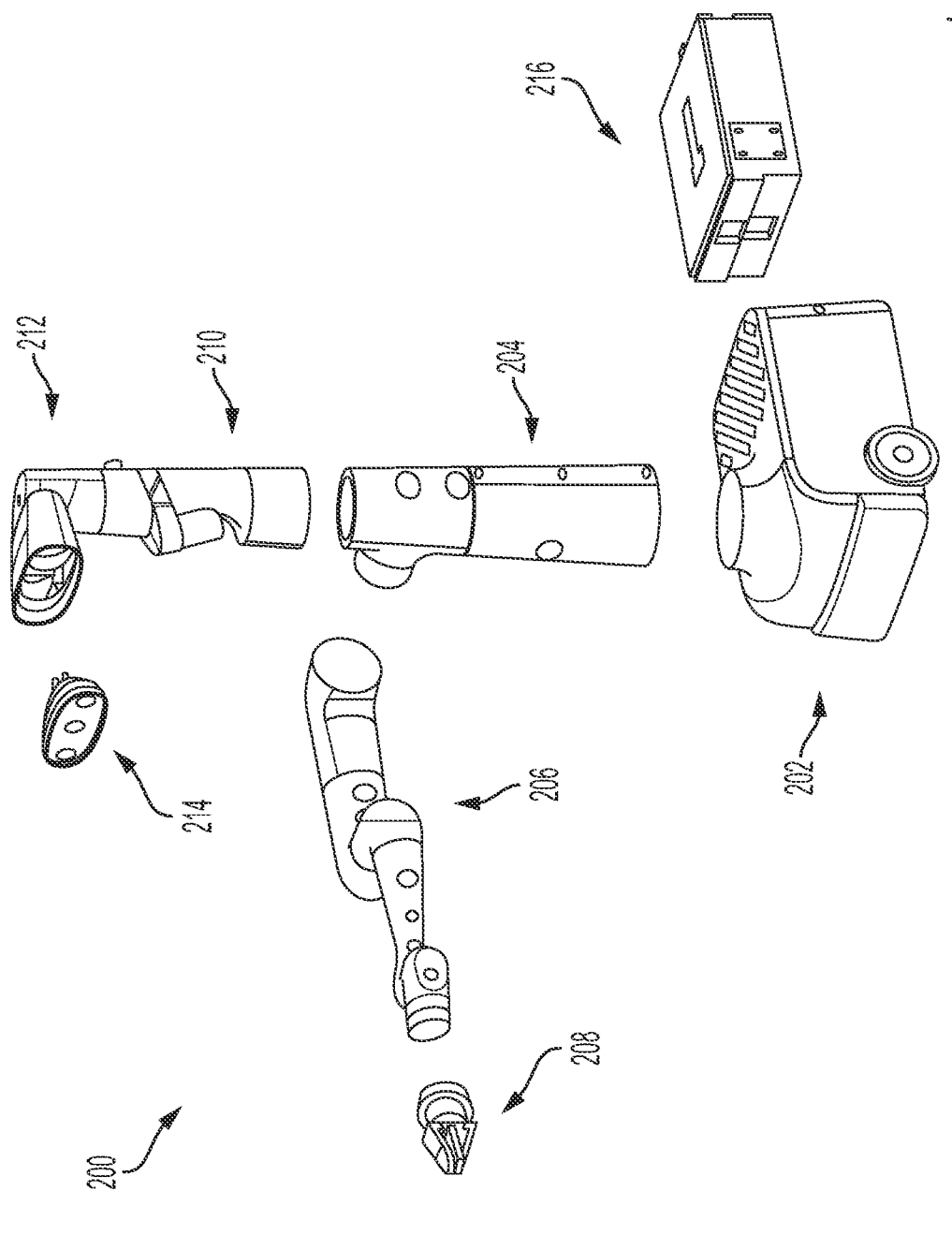
FIG. 3 illustrates an exploded view of a mobile robot, in accordance with example embodiments.

FIG. 2 illustrates a mobile robot, in accordance with example embodiments. FIG. 3 illustrates an exploded view of the mobile robot, in accordance with example embodiments. More specifically, a robot 200 may include a mobile base 202, a midsection 204, an arm 206, an end-of-arm system (EOAS) 208, a mast 210, a perception housing 212, and a perception suite 214. The robot 200 may also include a compute box 216 stored within mobile base 202.

The mobile base 202 includes two drive wheels positioned at a front end of the robot 200 in order to provide locomotion to robot 200. The mobile base 202 also includes additional casters (not shown) to facilitate motion of the mobile base 202 over a ground surface. The mobile base 202 may have a modular architecture that allows compute box 216 to be easily removed. Compute box 216 may serve as a removable control system for robot 200 (rather than a mechanically integrated control system). After removing external shells, the compute box 216 can be easily removed and/or replaced. The mobile base 202 may also be designed to allow for additional modularity. For example, the mobile base 202 may also be designed so that a power system, a battery, and/or external bumpers can all be easily removed and/or replaced.

The midsection 204 may be attached to the mobile base 202 at a front end of the mobile base 202. The midsection 204 includes a mounting column which is fixed to the mobile base 202. The midsection 204 additionally includes a rotational joint for arm 206. More specifically, the midsection 204 includes the first two degrees of freedom for arm 206 (a shoulder yaw J0 joint and a shoulder pitch J1 joint). The mounting column and the shoulder yaw J0 joint may form a portion of a stacked tower at the front of mobile base 202. The mounting column and the shoulder yaw J0 joint may be coaxial. The length of the mounting column of midsection 204 may be chosen to provide the arm 206 with sufficient height to perform manipulation tasks at commonly encountered height levels (e.g., coffee table top and counter top levels). The length of the mounting column of midsection 204 may also allow the shoulder pitch J1 joint to rotate the arm 206 over the mobile base 202 without contacting the mobile base 202.

The arm 206 may be a 7DOF robotic arm when connected to the midsection 204. As noted, the first two DOFs of the arm 206 may be included in the midsection 204. The remaining five DOFs may be included in a standalone section of the arm 206 as illustrated in FIGS. 2 and 3. The arm 206 may be made up of plastic monolithic link structures. Inside the arm 206 may be housed standalone actuator modules, local motor drivers, and thru bore cabling.

The EOAS 208 may be an end effector at the end of arm 206. EOAS 208 may allow the robot 200 to manipulate objects in the environment. As shown in FIGS. 2 and 3, EOAS 208 may be a gripper, such as an underactuated pinch gripper. The gripper may include one or more contact sensors such as force/torque sensors and/or non-contact sensors such as one or more cameras to facilitate object detection and gripper control. EOAS 208 may also be a different type of gripper such as a suction gripper or a different type of tool such as a drill or a brush. EOAS 208 may also be swappable or include swappable components such as gripper digits.

The mast 210 may be a relatively long, narrow component between the shoulder yaw J0 joint for arm 206 and perception housing 212. The mast 210 may be part of the stacked tower at the front of mobile base 202. The mast 210 may be fixed relative to the mobile base 202. The mast 210 may be coaxial with the midsection 204. The length of the mast 210 may facilitate perception by perception suite 214 of objects being manipulated by EOAS 208. The mast 210 may have a length such that when the shoulder pitch J1 joint is rotated vertical up, a topmost point of a bicep of the arm 206 is approximately aligned with a top of the mast 210. The length of the mast 210 may then be sufficient to prevent a collision between the perception housing 212 and the arm 206 when the shoulder pitch J1 joint is rotated vertical up.

As shown in FIGS. 2 and 3, the mast 210 may include a 3D lidar sensor configured to collect depth information about the environment. The 3D lidar sensor may be coupled to a carved-out portion of the mast 210 and fixed at a downward angle. The lidar position may be optimized for localization, navigation, and for front cliff detection.

The perception housing 212 may include at least one sensor making up perception suite 214. The perception housing 212 may be connected to a pan/tilt control to allow for reorienting of the perception housing 212 (e.g., to view objects being manipulated by EOAS 208). The perception housing 212 may be a part of the stacked tower fixed to the mobile base 202. A rear portion of the perception housing 212 may be coaxial with the mast 210.

The perception suite 214 may include a suite of sensors configured to collect sensor data representative of the environment of the robot 200. The perception suite 214 may include an infrared(IR)-assisted stereo depth sensor. The perception suite 214 may additionally include a wide-angled red-green-blue (RGB) camera for human-robot interaction and context information. The perception suite 214 may additionally include a high resolution RGB camera for object classification. A face light ring surrounding the perception suite 214 may also be included for improved human-robot interaction and scene illumination. In some examples, the perception suite 214 may also include a projector configured to project images and/or video into the environment.

Figure 4:
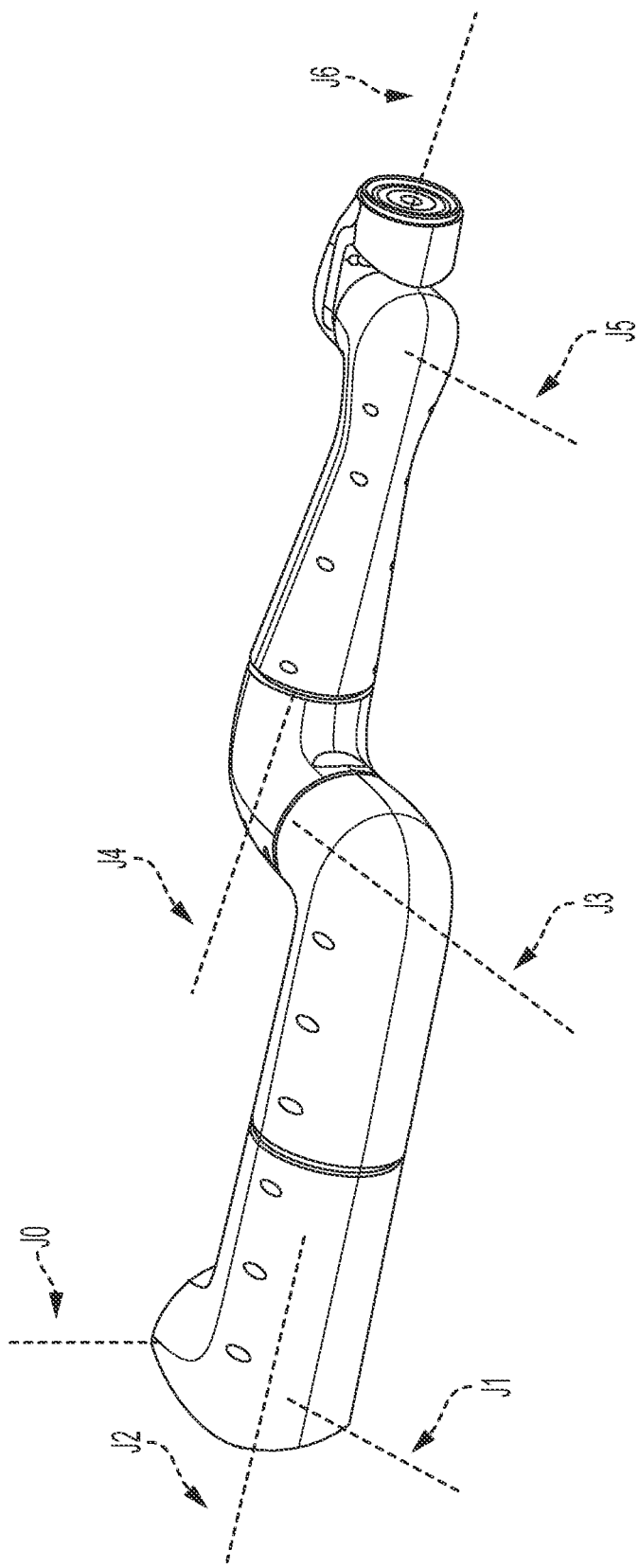
FIG. 4 illustrates a robotic arm, in accordance with example embodiments.

FIG. 4 illustrates a robotic arm, in accordance with example embodiments. The robotic arm includes 7 DOFs: a shoulder yaw J0 joint, a shoulder pitch J1 joint, a bicep roll J2 joint, an elbow pitch J3 joint, a forearm roll J4 joint, a wrist pitch J5 joint, and wrist roll J6 joint. Each of the joints may be coupled to one or more actuators. The actuators coupled to the joints may be operable to cause movement of links down the kinematic chain (as well as any end effector attached to the robot arm).

The shoulder yaw J0 joint allows the robot arm to rotate toward the front and toward the back of the robot. One beneficial use of this motion is to allow the robot to pick up an object in front of the robot and quickly place the object on the rear section of the robot (as well as the reverse motion). Another beneficial use of this motion is to quickly move the robot arm from a stowed configuration behind the robot to an active position in front of the robot (as well as the reverse motion).

The shoulder pitch J1 joint allows the robot to lift the robot arm (e.g., so that the bicep is up to perception suite level on the robot) and to lower the robot arm (e.g., so that the bicep is just above the mobile base). This motion is beneficial to allow the robot to efficiently perform manipulation operations (e.g., top grasps and side grasps) at different target height levels in the environment. For instance, the shoulder pitch J1 joint may be rotated to a vertical up position to allow the robot to easily manipulate objects on a table in the environment. The shoulder pitch J1 joint may be rotated to a vertical down position to allow the robot to easily manipulate objects on a ground surface in the environment.

The bicep roll J2 joint allows the robot to rotate the bicep to move the elbow and forearm relative to the bicep. This motion may be particularly beneficial for facilitating a clear view of the EOAS by the robot's perception suite. By rotating the bicep roll J2 joint, the robot may kick out the elbow and forearm to improve line of sight to an object held in a gripper of the robot.

Moving down the kinematic chain, alternating pitch and roll joints (a shoulder pitch J1 joint, a bicep roll J2 joint, an elbow pitch J3 joint, a forearm roll J4 joint, a wrist pitch J5 joint, and wrist roll J6 joint) are provided to improve the manipulability of the robotic arm. The axes of the wrist pitch J5 joint, the wrist roll J6 joint, and the forearm roll J4 joint are intersecting for reduced arm motion to reorient objects. The wrist roll J6 point is provided instead of two pitch joints in the wrist in order to improve object rotation.

In some examples, a robotic arm such as the one illustrated in FIG. 4 may be capable of operating in a teach mode. In particular, teach mode may be an operating mode of the robotic arm that allows a user to physically interact with and guide robotic arm towards carrying out and recording various movements. In a teaching mode, an external force is applied (e.g., by the user) to the robotic arm based on a teaching input that is intended to teach the robot regarding how to carry out a specific task. The robotic arm may thus obtain data regarding how to carry out the specific task based on instructions and guidance from the user. Such data may relate to a plurality of configurations of mechanical components, joint position data, velocity data, acceleration data, torque data, force data, and power data, among other possibilities.

During teach mode the user may grasp onto the EOAS or wrist in some examples or onto any part of robotic arm in other examples, and provide an external force by physically moving robotic arm. In particular, the user may guide the robotic arm towards grasping onto an object and then moving the object from a first location to a second location. As the user guides the robotic arm during teach mode, the robot may obtain and record data related to the movement such that the robotic arm may be configured to independently carry out the task at a future time during independent operation (e.g., when the robotic arm operates independently outside of teach mode). In some examples, external forces may also be applied by other entities in the physical workspace such as by other objects, machines, or robotic systems, among other possibilities.

Figure 5:
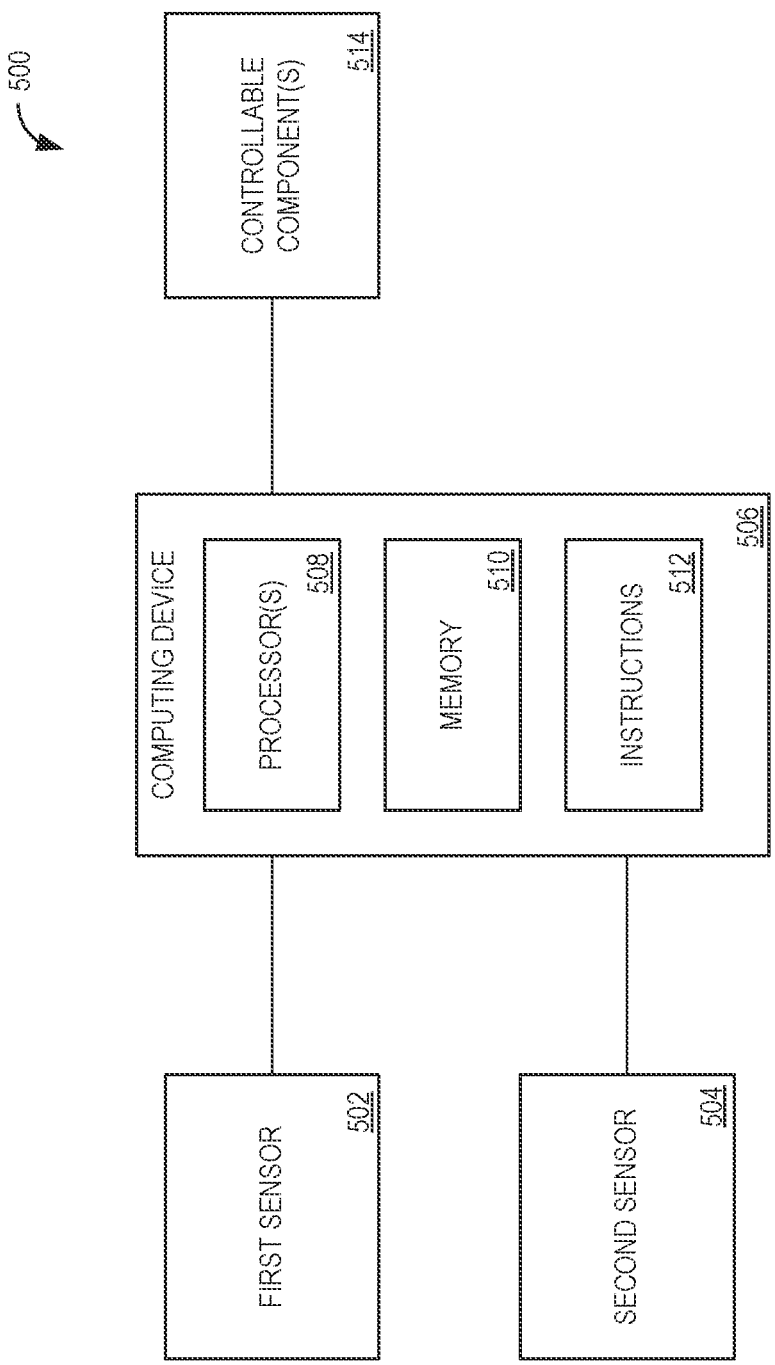
FIG. 5 is a block diagram of a system, in accordance with example embodiments.

FIG. 5 is a block diagram of a system 500, in accordance with example embodiments. In particular, FIG. 5 shows a first sensor 502, a second sensor 504, a computing device 506, and one or more controllable component(s) 514.

First sensor 502 can include a first type of sensor used for generating a first depth map. For example, the first sensor 502 can be a multiscopic (e.g., stereoscopic) image sensor that captures a plurality of images of an environment at different poses. Depth information can be derived from the multiscopic images by mapping pixels of each image to those of another image, and determining disparities between the corresponding pixels. First sensor 502 can include other sensor types as well.

Second sensor 504 can include a second type of sensor used for generating a second depth map. For example, the second sensor 504 can be a monoscopic sensor that captures a single image of an environment from a single pose. Depth information can be derived from implied perspective of edges in the image and from identified objects in the image. For example, a neural network or other machine learning model can be trained to take a monocular image as an input and output a depth map based on the monocular image. Second sensor 504 can include other sensor types as well.

The first depth map and the second depth map may be determined, for example, by computing device 506 or by another computing device, or can be determined by the first sensor 502 and the second sensor 504 respectively. In some contexts, first sensor 502 and second sensor 504 can be mounted on a robot, such as robot 200 described above with respect to FIGS. 2 and 3 (e.g., first sensor 502 and second sensor 504 can respectively correspond to the IR-assisted stereo depth sensor and the wide-angled RGB camera described above with respect to the perception suite 214). Depth information determined from the first depth map and the second depth map can allow robot 200 to navigate within an environment, or allow for robot 200 to interact with objects in the environment (e.g., using the robotic arm shown in FIG. 4).

Computing device 506 includes one or more processor(s) 508, a memory 510, and instructions 512.

Processor(s) 508 may operate as one or more general-purpose hardware processors or special purpose hardware processors (e.g., digital signal processors, application specific integrated circuits, etc.). Processor(s) 508 may be configured to execute computer-readable program instructions (e.g., instructions 512) and manipulate data, such as depth map information or sensor data received from first sensor 502 and second sensor 504, which may be stored in memory 510. Processor(s) 508 may also directly or indirectly interact with other components of system 500 or other systems or components (e.g., robotic system 100, sensor(s) 112, power source(s) 114, mechanical components 110, or electrical components 116). In some examples, processor(s) 508 can correspond to processor(s) 102 described above with respect to FIG. 1.

Memory 510 may be one or more types of hardware memory. For example, Memory 510 may include or take the form of one or more computer-readable storage media that can be read or accessed by processor(s) 508. The one or more computer-readable storage media can include volatile or non-volatile storage components, such as optical, magnetic, organic, or another type of memory or storage, which can be integrated in whole or in part with processor(s) 508. In some implementations, memory 510 can be a single physical device. In other implementations, data storage 104 can be implemented using two or more physical devices, which may communicate with one another via wired or wireless communication. As noted previously, memory 510 may include computer-readable program instructions (e.g., instructions 512) and data. The data may be any type of data, such as configuration data, sensor data, or diagnostic data, among other possibilities.

Computing device 506 is configured for performing operations related to depth map, such as receiving or generating two or more depth maps from first sensor 502 and second sensor 504 and generating a depth map based on fusing the two or more depth maps. For example, processor(s) 508 can execute instructions 512 to carry out such operations. Further details regarding these depth map fusion operations are provided below with respect to FIGS. 6A-6G and FIG. 7. Computing device 506, and system 500 more generally, can be incorporated into one or more other systems, such as robotic system 100. For example, computing device 506 can be the same as control system 118 of robotic system 100 or be incorporated into robotic system 100 as a subsystem for depth sensing operations.

Responsive to generating a depth map based on fusing a plurality of depth maps, computing device 506 can control one or more controllable component(s) 514 to carry out operations. For example, computing device 506 can determine whether a task should be performed based on a confidence level associated with the generated depth map and, responsive to determining that the task should be performed, control controllable component(s) 514 can correspond to mechanical components 110, electrical components 116, or sensors 112 described above with respect to FIG. 1.

Figure 6B:
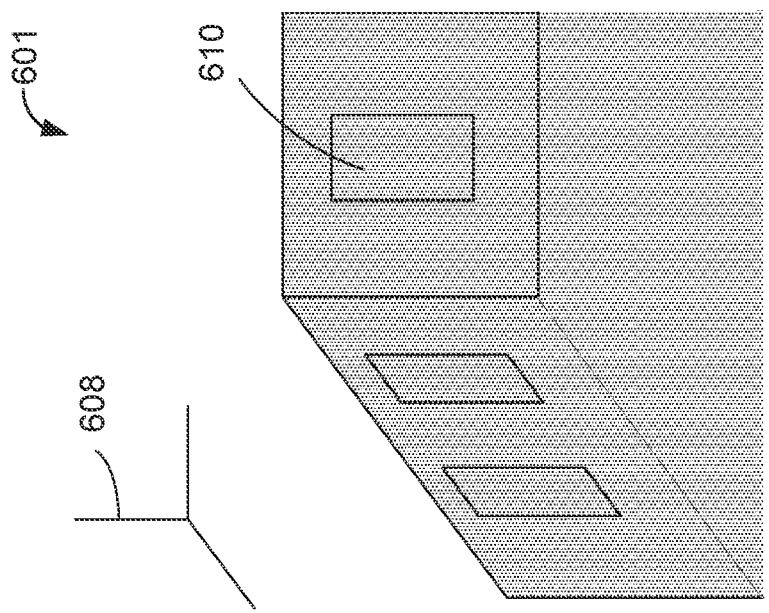
FIG. 6B illustrates a second depth map, in accordance with example embodiments.
Figure 6A:
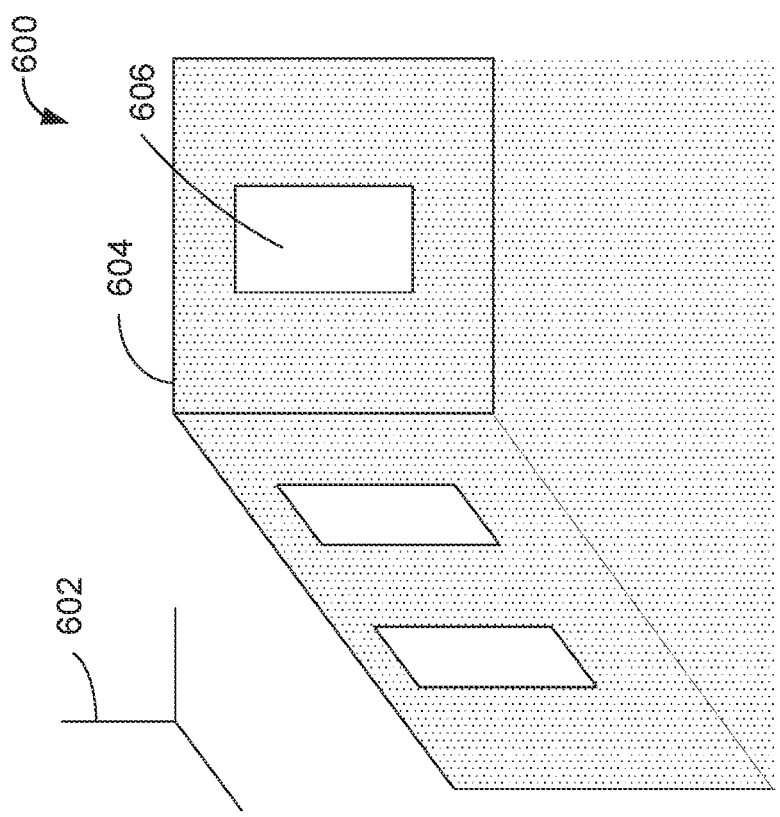
FIG. 6A illustrates a first depth map, in accordance with example embodiments.

FIG. 6A illustrates a first depth map 600, in accordance with example embodiments. In particular, FIG. 6A shows a simplified illustration of a depth map in which data points are shown as dots and perspective lines are drawn to provide an impression of depth. Thus, FIG. 6A shows portions of a scene for which first depth map 600 includes information, and portions for which first depth map 600 does not include information. In practice, first depth map 600 may visually be represented by voxels or another form of 3D rendering. For processing purposes, the depth map can be represented by a 2D array of pixel depths. The following description of FIGS. 6A-6G shows a simplified representation of fusing a plurality of depth maps.

First depth map 600 is defined in terms of a first scale 602, which defines distances between adjacent pixel depths and also defines distances represented by each pixel depth. Within examples, different dimensions of first scale 602 may be scaled differently. For purposes of the present example, scale 602 can be understood as an absolute scale (i.e., the scale translates adjacent pixel depths into depth information represented in terms of distance units, such as meters or feet).

First depth map 600 includes a scene that has depth information determined at a first resolution associated with a first sensor (e.g. sensor 502), and a first region 606 having a resolution less than the first resolution. First region 606 is depicted as having zero depth information for purposes of example, but in practice, some regions may have less depth information than others. For purposes of the forthcoming description, first region 606 should be understood as having less than a threshold resolution, or, more generally, less than a threshold level of depth information. In the context of a stereoscopic depth map, regions with relatively low depth information may result from transparent, partially-transparent, refractive, or specular materials in an environment, or result from occlusions and regions with a relatively high signal-to-noise ratio (SNR). These areas without depth information can be represented with NULL points in the depth map array.

Because first depth map 600 has one or more regions with low depth information, a system that utilizes first depth map 600 may be less confident in performing operations in the vicinity of these "holes" in the depth map. For example, in the context of robotic system 100, control system 118 may refrain from controlling the robot to navigate within a threshold distance of pixel depth surrounding first region 606 due to the lack of depth information. In the present example, first region 606 can be understood as representing a window, though other occlusions can exist in the context of a stereoscopic depth map or other types of depth maps.

FIG. 6B illustrates a second depth map 601, in accordance with example embodiments. In particular, FIG. 6B shows a simplified illustration of a depth map in which data points are shown as dots and perspective lines are drawn to provide an impression of depth. Thus, FIG. 6B shows portions of a scene for which second depth map 601 includes information. In practice, second depth map 601 may visually be represented by voxels or another form of 3D rendering. For processing purposes, the depth map can be represented by a 2D array of pixel depths.

As shown in FIG. 6B, second depth map 601 represents the same scene depicted in FIG. 6A, and thus a second sensor (e.g., second sensor 504) used to capture sensor data used to generate second depth map 601 can be understood as capturing depth information of an environment from the same or similar vantage point as that of a first sensor used to capture depth information for first depth map 600. Further, as shown in FIG. 6B, second depth map is represented at a second resolution that is different from the first resolution.

Second depth map 601 is defined in terms of a second scale 608, which defines distances between adjacent pixel depths and also defines distances represented by each pixel depth. Within examples, different dimensions of second scale 608 may be scaled differently. For purposes of the present example, scale 608 can be understood as a relative (e.g., depth is determined relative to other pixels in the array, and can be represented from 0 to 1, without distance units). For example, a monoscopic RGB image can be used to determine second depth map 601. As shown in FIG. 6B, second depth map 601 has more complete depth information, but this information is not scaled in a manner that is usable in certain contexts (e.g., a robot cannot always effectively navigate based on only a relative scale). Further, depth information derived from a monoscopic image may be less accurate than that derived from a multiscopic image capture device or other devices.

Because first depth map 600 lacks complete depth information and second depth map 601 lacks absolute scale, the two depth maps can be fused to form a more robust representation of the environment. Within examples, this may be performed in response to determining a perceived deficiency of one or more depth maps. For example, first region 606 may be part of a region of interest based on a trajectory of a robot, and fusing first depth map 600 and second depth map 601 can be fused responsive to determining that a portion of the region of interest (i.e., first region 606 or a part of first region 606) lacks a threshold level of depth information.

FIG. 6B also shows a second region 610 of second depth map 601 that corresponds to first region 606 of first depth map 600. The following description relates particularly to first region 606 and second region 610, but other regions within second depth map 601 may similarly be fused with first depth map 600.

Figure 6D:
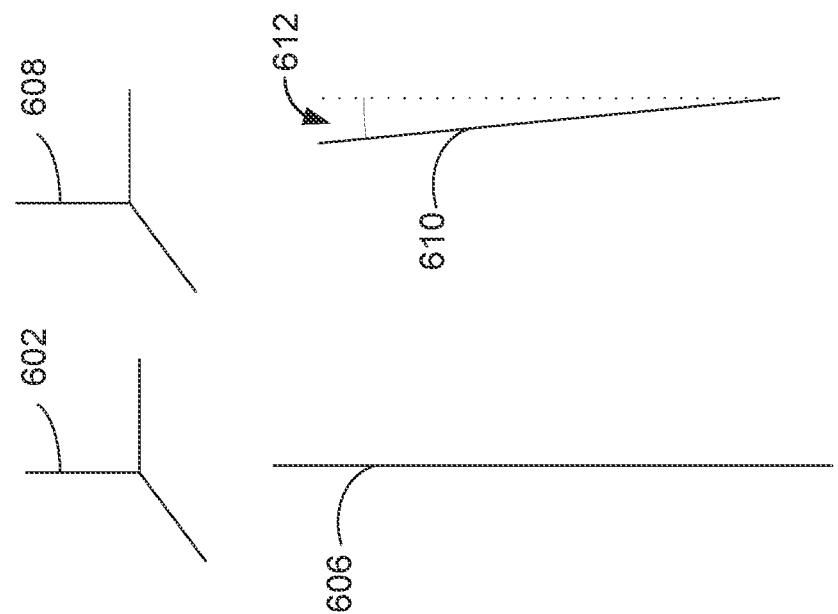
FIG. 6D a side view of a region of a second depth map aligned with a corresponding region of a first depth map, in accordance with example embodiments.
Figure 6C:
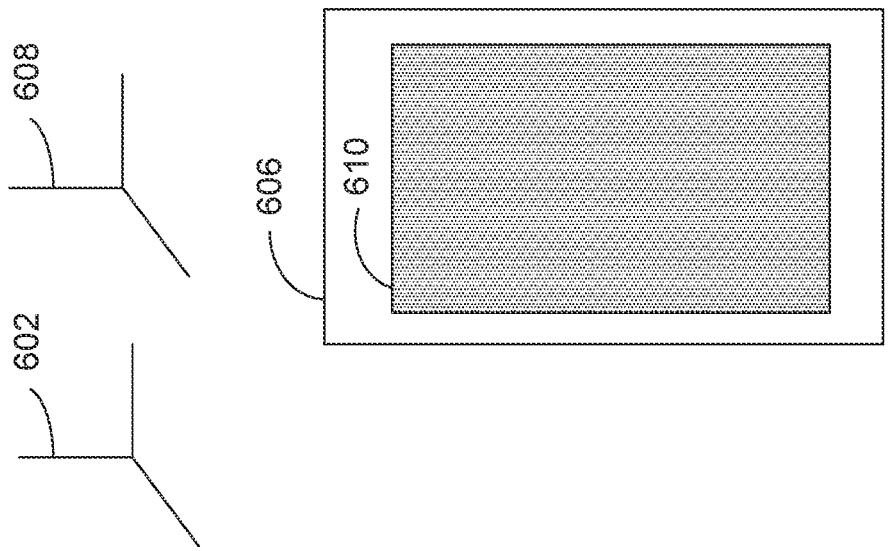
FIG. 6C shows a front view of a region of a second depth map aligned with a corresponding region of a first depth map, in accordance with example embodiments.

FIG. 6C shows a front view of region of a second depth map aligned with a corresponding region of a first depth map, in accordance with example embodiments. In particular, FIG. 6C shows second region 610 aligned with first region 606. Though only second region 610 is depicted as being so aligned, the entirety of second depth map 601 may first be aligned with first depth map 600 to determine that second region 610 corresponds to first region 606. As depicted in FIG. 6C, first scale 602 and second scale 608 may not initially be adjusted when aligning second region 610 with first region 606. Accordingly, aligning second depth map 601 with first depth map 600 may require scaling to make edges of second region 610 match edges for first region 606.

FIG. 6D shows a side view of second region 610 aligned with first region 606, in accordance with example embodiments. As shown in FIG. 6D, edges of second region 610 are at an angle 612 relative to first region 606. Accordingly, aligning second depth map 601 with first depth map 600 may require reorienting to make edges of second region 610 match edges for first region 606. Second region 610, and second depth map 601 more generally, can be transformed to match edges of second region 610 with edges of first region 606. Though edges are depicted and referred to in the present example, it should be understood that such edges can be represented in a depth map by edge pixel depths.

Figure 6F:
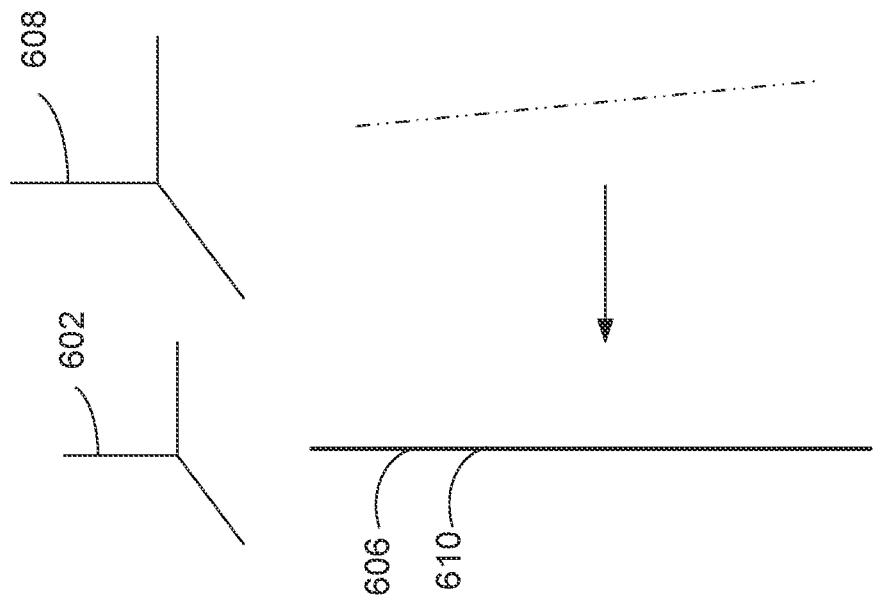
FIG. 6F a side view of a transformed region of a second depth map aligned with a corresponding region of a first depth map, in accordance with example embodiments.
Figure 6E:
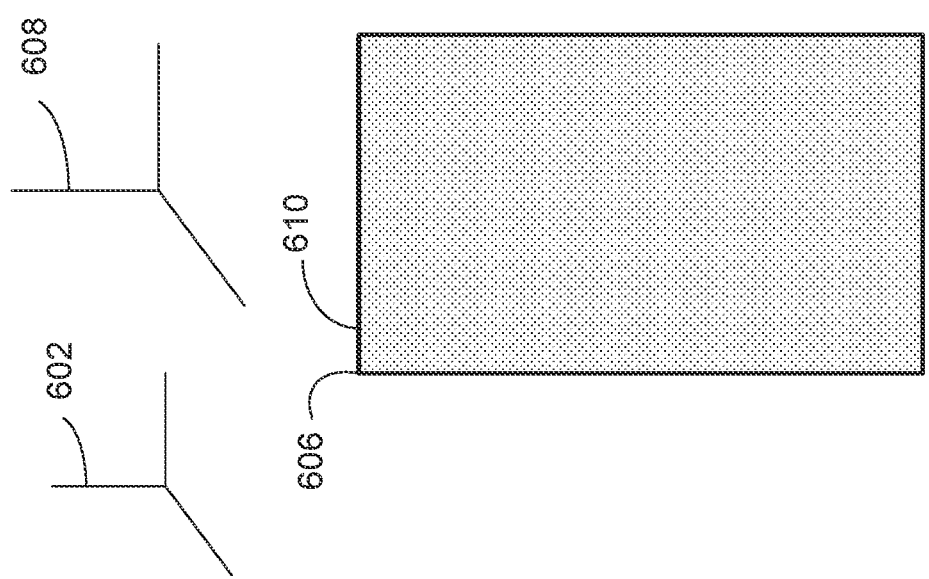
FIG. 6E shows a front view of a transformed region of a second depth map aligned with a corresponding region of a first depth map, in accordance with example embodiments.

FIG. 6E shows a front view of a transformed second region 610 aligned with first region 606, in accordance with example embodiments. In particular, FIG. 6E shows that second scale has been adjusted to match the first scale 602. Thus, in this context first scale 602 serves as a reference scale towards which a relative scale (second scale 608) can be adjusted. After adjusting the scale of second region 610, the pixel resolution of second region 610 is correspondingly adjusted such that edges of second region 610 match with edges of first region 606.

FIG. 6F a side view of transformed second region 610 aligned with first region 606, in accordance with example embodiments. As shown in FIG. 6F, adjusting second scale 608 of second depth map 601 may effectively translate second region 610 towards first region 606. Further, transforming second region 610 removes relative angle 612, causing edges of second region 610 to match edges of first region 606. Accordingly, adjusting second scale 608 may involve adjusting the scale of some pixels in region 610 differently than scaling other pixels. For example, pixel depths in a top edge of second region 610 may be adjusted differently that pixel depths in a bottom edge of second region 610. In examples, (e.g., examples where first region 606 and second region 610 are more amorphous), each the scale of each pixel depth can be adjusted differently.

As described above, transforming second region 610 can be based on a reference depth scale (first scale 602) and the relative depth scale (second scale 608). This can further involve causing second edge pixel depths of second region 610 to match first edge pixel depths that surround first region 606 in second depth map 600, such that the second edge pixel depths are coextensive with the first edge pixel depths.

Fusing first depth map 600 and second depth map 601 can be performed in accordance with an optimization function. For example, a scaling term can be applied to each pixel depth in second region 610 such that surrounding region 604 of first depth map 600 and second region 610 of second depth map 601 are piecewise smooth. More particularly, a scaling factor $\alpha_{i,j}$ (where i,j are the pixel coordinates) can be determined that maps an unscaled estimated depth $d^{r2*}_{i,j}$ (represented by second region 610 in second depth map 601) to a scaled depth: $dr^2_{i,j} = \alpha_{i,j} d^{r1}_{i,j}$ (represented by first region 606 in first depth map 600). This is achieved by applying the optimization function:

$$\alpha = \Sigma_{i,j}(\Delta_{i,j}(\alpha_{i,j}d^{r2}_{i,j}-d^{r1}_{i,j})^2)+\lambda\|\alpha\|$$

Here, $\Delta_{i,j}$ is an indicator where first depth map 600 contains depth information ($d^{r1}_{i,j}$). Accordingly $\Sigma_{i,j}(\Delta_{i,j}(\alpha_{i,j}d^{r2}_{i,j}-d^{r1}_{i,j})^2)$ accounts for known data from first depth map 600 and $\lambda\|\alpha\|$ is a smoothing term enforced on $\alpha$. For example, $\lambda\|\alpha\|$ can be a mean squared error (L2) term enforced on a to smooth a gradient of the second region 610 and surrounding region 604, an isotropic total variation (TVL1) term enforced on a such that second region 610 and surrounding region 604 are piecewise smooth, an anistropic total variation (TVL2) term enforced on a such that second region 610 and surrounding region 604 are piecewise smooth, or another gradient smoothing term. For an L2 term and a TVL2 term, this optimization function can be solved as a conjugate gradient descent which can be expressed as a tensorflow graph. For a TVL1 term, the optimization function can be solved using a total variation minimization by Augmented Lagrangian and ALternating direction ALgorithms (TVAL3). Other examples of solving the optimization function are possible. Within examples, mapping second region 610 in this manner to an absolute scale can allow for training a neural network associated with second depth map 601. For example, the scaling factor can be chained to a monoscopic RGB depth sensing network, and potentially be jointly trained while leveraging unscaled values for purposes of fusing depth maps.

Figure 6G:
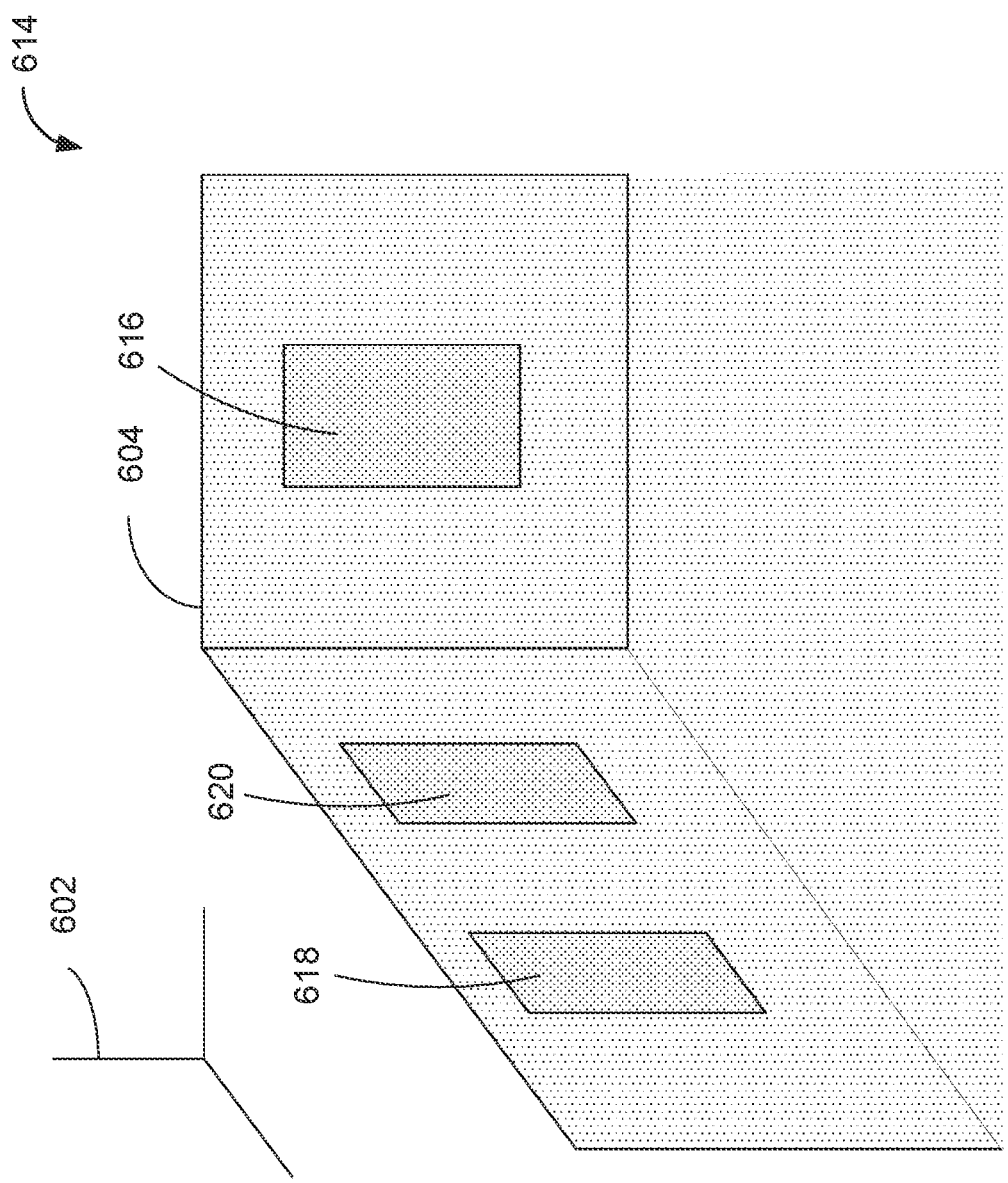
FIG. 6G illustrates a third depth map generated based on a first depth map and a second depth map, in accordance with example embodiments.

FIG. 6G illustrates a third depth map 614 generated based on first depth map 600 and second depth map 601, in accordance with example embodiments. As shown in FIG. 6G, third depth map 614 can be defined in terms of the reference scale (first scale 602), and includes surrounding region 604 of first depth map 600 and inpainted region 616 resulting from fusing first region 606 with the transformed and aligned second region 610 of second depth map 601. The surrounding region 604 and inpainted region 616 are joined at first edge pixel depths of the surrounding region 604 and second edge pixel depths of inpainted region 616.

The process depicted in FIGS. 6A-6G can be performed with respect to multiple regions of first depth map 600 and second depth map 601. Accordingly, third depth map 614 is depicted with first region 606 being fused with second region 610, and additional regions 618 and 620 being fused with corresponding regions of second depth map 601. Though third depth map 614 is depicted as including surrounding region 604, it should be understood that forming third depth map 614 can include generating a new depth map formed from surrounding region surrounding region 604 and fused regions of first depth map 600 and second depth map 601.

Figure 7:
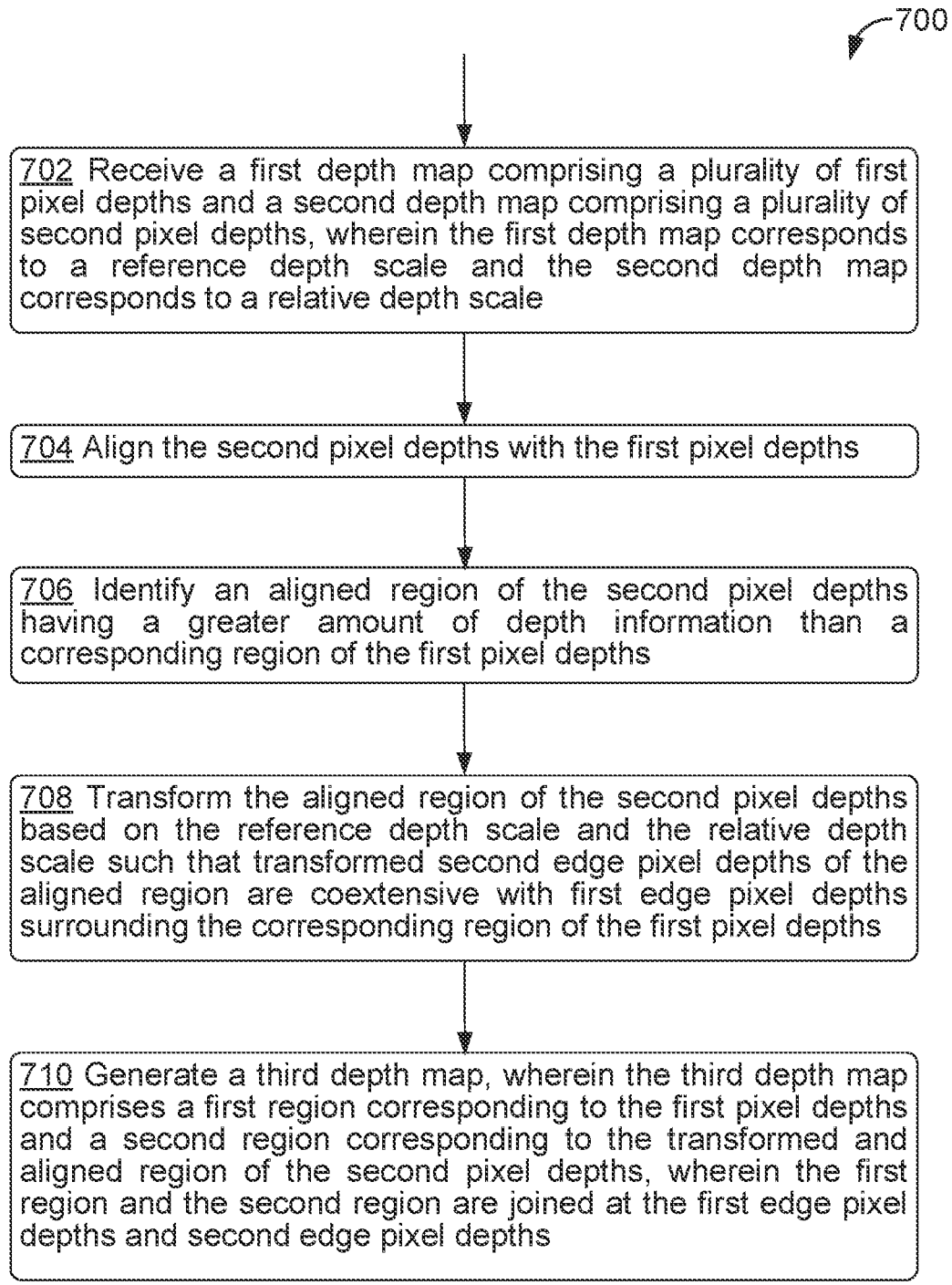
FIG. 7 is a block diagram of a method, in accordance with example embodiments.

FIG. 7 is a block diagram of a method 700, in accordance with example embodiments. In some examples, method 700 of FIG. 7 may be carried out by a control system, such as control system 118 of robotic system 100 or a computing device such as computing device 506 of system 500. In further examples, method 700 may be carried by one or more processors, such as processor(s) 102 and/or processor(s) 508, executing program instructions, such as program instructions 106 and/or instructions 512, stored in a data storage, such as data storage 104 and/or memory 510. Execution of method 700 may involve a robotic device, such as illustrated and described with respect to FIGS. 1-4 or another system. Other robotic devices may also be used in the performance of method 700. In further examples, some or all of the blocks of method 700 may be performed by a control system remote from the robotic device or from system 500. In yet further examples, different blocks of method 700 may be performed by different control systems, located on and/or remote from a robotic device or from system 500.

At block 702 method 700 includes receiving a first depth map (e.g., first depth map 600) that includes a plurality of first pixel depths and a second depth map (e.g., second depth map 601) that includes a plurality of second pixel depths. Within examples, the first depth map corresponds to a reference depth scale and the second depth map corresponds to a relative depth scale.

At block 704, method 700 includes aligning the second pixel depths with the first pixel depths. For example, this may involve aligning all or part of second depth map 601 with all or part of first depth map 600.

At block 706, method 700 includes identifying an aligned region of the second pixel depths having a greater amount of depth information than a corresponding region of the first pixel depths. For example, the first depth map may have one or more regions that are occluded. Block 706 may be performed in accordance with FIGS. 6C, 6D, and the corresponding description thereof.

At block 708, method 700 includes transforming the aligned region of the second pixel depths based on the reference depth scale and the relative depth scale such that transformed second edge pixel depths of the aligned region are coextensive with first edge pixel depths surrounding the corresponding region of the first pixel depths. For example, this may be performed in accordance with FIGS. 6E, 6F, and the corresponding description thereof.

At block 710, method 700 includes generating a third depth map (e.g., third depth map 614). The third depth map includes a first region (e.g., surrounding region 604) corresponding to the first pixel depths and a second region (e.g., inpainted region 616) corresponding to the transformed and aligned region of the second pixel depths. The first region and the second region are joined at the first edge pixel depths and second edge pixel depths.

Within examples, the first depth map includes a multi-scopic depth map derived from a plurality of images captured from a plurality of image capture devices and the second depth map includes a monoscopic depth map derived from a single image captured from a single image capture device. For example, the plurality of image capture devices can include a pair of image capture devices, and the multi-scopic depth map can include a stereoscopic depth map derived from at least a pair of images captured from the pair of image capture devices. Further, within examples, the monoscopic depth map may correspond to a single RGB image. Within related examples, identifying the aligned region of the second pixel depths having a greater amount of depth information than the corresponding region of the first pixel depths includes determining one or more regions of the first depth map having less than a threshold level of depth information. For example, the threshold level of depth information can correspond to an expected pixel depth density (e.g., a resolution) associated with a multiscopic image.

Within examples, method 700 further includes determining a first sensor used for determining the first depth map, determining a second sensor used for determining the second depth map, and setting a depth scale of the first depth map as the reference depth scale based on a sensor type of the first sensor. In related examples, setting the depth scale of the first depth map as the reference depth scale based on the sensor type of the first sensor includes determining that the sensor type of the first sensor corresponds to an absolute scale (i.e., a scale defined in terms of distance units), and setting the depth scale of the first depth map as the reference depth scale based on the sensor type of the first sensor corresponding to the absolute scale. For example, LIDAR depth data or stereoscopic depth data may be more suitable than monoscopic depth data for purposes of the reference scale. Within examples, a predetermined hierarchy of sensor depth accuracies can be used to determine which depth scale (and correspondingly, which depth map) to select for purposes of the reference scale.

Within examples, the reference depth scale is represented in terms of distance units and the relative depth scale is represented in terms of relative distances between pixel depths. For example, a stereoscopic depth scale may be represented in terms of units, while a monoscopic depth scale may be represented in terms of other pixel depths (e.g., from a range of 0 to 1). In related examples, transforming the aligned region of the second pixel depths based on the reference depth scale and the relative depth scale includes altering the relative distances between pixel depths in the aligned region such that the pixel depths in the aligned region are represented in terms of distance units. For example, this may include determining a scaling factor for each pixel depth in the second region in accordance with an optimization function.

Within examples, method 700 further includes adjusting a resolution of the third depth map such that the amount of depth information is constant throughout the third depth map. For example, using depth map 614 as an example, the fused regions (i.e., regions 606, 616, and 618) can be downsampled to mirror the resolution of surrounding region 604.

Within examples, method 700 further includes determining that the first depth map lacks a desired pixel depth resolution (e.g., an expected stereoscopic depth map resolution). In these examples, generating the third depth map can include generating the third depth map based on determining that the first depth map lacks the desired pixel depth resolution. In related examples, determining that the first depth map lacks the desired pixel depth resolution includes determining that a pixel depth resolution of the corresponding region of the first pixel depths is less than a threshold pixel depth resolution.

Within examples, transforming the aligned region of the second pixel depths based on the reference depth scale and the relative depth scale such that transformed second edge pixel depths of the aligned region are coextensive with first edge pixel depths surrounding the corresponding region of the first pixel depths includes applying an optimization function to the aligned region. In these examples, the optimization function can include comprises (i) a scaling factor that maps pixel depths within the aligned region to the reference scale, and (ii) a piecewise smoothness term that reduces depth differences between the transformed second edge pixel depths and the first edge pixel depths.

Within examples, method 700 can be carried out by a computing device that corresponds to a controller of a robot. The controller is configured to navigate the robot within an environment based on the third depth map or to cause the robot to interact with an object based on the third depth map.

Though examples described herein involve generating a depth map by fusing depth information derived from two sensors, it should be understood that operations can similarly be carried out for depth information from three or more sensors as well. For example one or more regions of depth maps from each sensor in a plurality of sensors (e.g., including a LIDAR device, a stereoscopic image capture device, and a monoscopic image capture device, or another combination of depth-sensing devices) can be merged in a similar manner to the fusion process described above with respect to first region 606 and second region 610.

III. Conclusion

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software or hardware modules in the same physical device. However, other information transmissions may be between software modules or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A computer-implemented method comprising:
    receiving a first depth map comprising a first plurality of depth values and a second depth map comprising a second plurality of depth values;
    aligning at least part of the second depth map with a corresponding part of the first depth map;
    identifying a first aligned region of the first depth map having a different amount of depth information than a second aligned region of the second depth map; and
    inpainting the first aligned region of the first depth map based on depth values of the second aligned region of the second depth map by determining a plurality of scaling factors comprising, for each respective depth value of a plurality of pixels in the second aligned region, a corresponding scaling factor between the respective depth value and a corresponding depth value of the first aligned region, such that an output value of an optimization function is reduced below a threshold value, wherein the optimization function is configured to compare, for each respective depth value of the plurality of pixels in the second aligned region, (i) the respective depth value scaled according to the corresponding scaling factor and (ii) the corresponding depth value of the first aligned region.

2. The computer-implemented method of claim 1, wherein the first depth map corresponds to a first depth scale that represents the first plurality of depth values using distance units and the second depth map corresponds to a second depth scale that represents the second plurality of depth values using unitless relative distances selected from a predetermined range.

3. The computer-implemented method of claim 2, further comprising:
    determining a first sensor type used for determining the first depth map;
    determining a second sensor type used for determining the second depth map;
    assigning the first depth scale to the first depth map based on the first sensor type; and
    assigning the second depth scale to the second depth map based on the second sensor type.

4. The computer-implemented method of claim 3, wherein:
    assigning the first depth scale to the first depth map based on determining that the first sensor type is configured to generate first sensor data that is usable to determine an absolute depth; and
    assigning the second depth scale to the second depth map based on determining that the second sensor type is configured to generate second sensor data that is usable to determine a relative depth.

5. The computer-implemented method of claim 1, wherein the first depth map comprises a multiscopic depth map determined based on multiple images captured by a multiscopic camera, and wherein the second depth map comprises a monoscopic depth map determined based on one image captured by a monoscopic camera.

6. The computer-implemented method of claim 1, wherein the output value of the optimization function is based on a smoothness associated with the plurality of scaling factors at least in the second aligned region of the second depth map.

7. The computer-implemented method of claim 6, wherein the optimization function is configured to measure the smoothness based on comparing (i) a first plurality of edge depth values of edge pixels of the first depth map that surround the first aligned region of the first depth map to (ii) a second plurality of edge depth values of edge pixels inside the second aligned region of the second depth map, wherein the second plurality of edge depth values has been scaled according to the corresponding scaling factors.

8. The computer-implemented method of claim 7, wherein comparing the first plurality of edge depth values to the second plurality of edge depth values comprises determining one or more of: (i) a mean squared error therebetween, (ii) an isotropic total variation therebetween, or (iii) an anisotropic total variation therebetween.

9. The computer-implemented method of claim 1, wherein, when the output value of the optimization function is reduced below the threshold value, a first plurality of edge depth values of edge pixels of the first depth map that surround the first aligned region of the first depth map is substantially coextensive with a second plurality of edge depth values of edge pixels inside the second aligned region of the second depth map, wherein the second plurality of edge depth values has been scaled according to the corresponding scaling factors.

10. The computer-implemented method of claim 1, wherein the plurality of pixels in the second aligned region corresponds at least to pixels in the first aligned region for which the first depth map includes depth values.

11. The computer-implemented method of claim 1, wherein inpainting the first aligned region of the first depth map comprises, for each respective pixel of a plurality of pixels in the first aligned region of the first depth map:
    determining a corresponding inpainted depth value by multiplying a corresponding depth value in the second aligned region by the corresponding scaling factor; and
    assigning the corresponding inpainted depth value to the respective pixel.

12. The computer-implemented method of claim 1, wherein identifying the first aligned region of the first depth map comprises:

determining that the second aligned region of the second depth map has more depth information than the first aligned region of the first depth map.

13. The computer-implemented method of claim 12, wherein determining that the second aligned region of the second depth map has more depth information than the first aligned region of the first depth map comprises:
determining one or more regions of the first depth map having less than a threshold density of depth values.

14. The computer-implemented method of claim 1, further comprising:
generating a third depth map based on the first depth map as inpainted; and
adjusting a resolution of the third depth map such that an amount of depth information is constant throughout the third depth map.

15. A system comprising:
a processor; and
a non-transitory computer-readable medium having stored thereon instructions that, when executed by the processor, cause the processor to perform operations comprising:
receiving a first depth map comprising a first plurality of depth values and a second depth map comprising a second plurality of depth values;
aligning at least part of the second depth map with a corresponding part of the first depth map;
identifying a first aligned region of the first depth map having a different amount of depth information than a second aligned region of the second depth map; and
inpainting the first aligned region of the first depth map based on depth values of the second aligned region of the second depth map by determining a plurality of scaling factors comprising, for each respective depth value of a plurality of pixels in the second aligned region, a corresponding scaling factor between the respective depth value and a corresponding depth value of the first aligned region, such that an output value of an optimization function is reduced below a threshold value, wherein the optimization function is configured to compare, for each respective depth value of the plurality of pixels in the second aligned region, (i) the respective depth value scaled according to the corresponding scaling factor and (ii) the corresponding depth value of the first aligned region.

16. The system of claim 15, wherein the first depth map corresponds to a first depth scale that represents the first plurality of depth values using distance units and the second depth map corresponds to a second depth scale that represents the second plurality of depth values using unitless relative distances selected from a predetermined range.

17. The system of claim 15, wherein the output value of the optimization function is based on a smoothness associated with the plurality of scaling factors at least in the second aligned region of the second depth map.

18. The system of claim 17, wherein the optimization function is configured to measure the smoothness based on comparing (i) a first plurality of edge depth values of edge pixels of the first depth map that surround the first aligned region of the first depth map to (ii) a second plurality of edge depth values of edge pixels inside the second aligned region of the second depth map, wherein the second plurality of edge depth values has been scaled according to the corresponding scaling factors.

19. The system of claim 15, wherein, when the output value of the optimization function is reduced below the threshold value, a first plurality of edge depth values of edge pixels of the first depth map that surround the first aligned region of the first depth map is substantially coextensive with a second plurality of edge depth values of edge pixels inside the second aligned region of the second depth map, wherein the second plurality of edge depth values has been scaled according to the corresponding scaling factors.

20. A non-transitory computer-readable medium having stored thereon instructions that, when executed by a computing system, cause the computing system to perform operations comprising:
receiving a first depth map comprising a first plurality of depth values and a second depth map comprising a second plurality of depth values;
aligning at least part of the second depth map with a corresponding part of the first depth map;
identifying a first aligned region of the first depth map having a different amount of depth information than a second aligned region of the second depth map; and
inpainting the first aligned region of the first depth map based on depth values of the second aligned region of the second depth map by determining a plurality of scaling factors comprising, for each respective depth value of a plurality of pixels in the second aligned region, a corresponding scaling factor between the respective depth value and a corresponding depth value of the first aligned region, such that an output value of an optimization function is reduced below a threshold value, wherein the optimization function is configured to compare, for each respective depth value of the plurality of pixels in the second aligned region, (i) the respective depth value scaled according to the corresponding scaling factor and (ii) the corresponding depth value of the first aligned region.

* * * * *